United States Patent [19]

Brosseau et al.

[11] 4,351,872

[45] Sep. 28, 1982

[54] UNIDIRECTIONAL STRETCH MESH LAMINATE AND METHOD

[75] Inventors: Janet V. Brosseau; Jon A. Brosseau, both of Los Altos, Calif.

[73] Assignee: Harvey G. Lowhurst, Atherton, Calif.

[21] Appl. No.: 2,066

[22] Filed: Jan. 8, 1979

Related U.S. Application Data

[62] Division of Ser. No. 827,229, Aug. 24, 1977, Pat. No. 4,146,021.

[51] Int. Cl.³ .............................................. B32B 27/14
[52] U.S. Cl. ..................................... 428/198; 156/229; 156/290; 428/109; 428/110; 428/137; 428/138; 428/247; 428/255; 428/311.5; 428/316.6; 428/910
[58] Field of Search ............... 428/196, 197, 198, 247, 428/253, 255, 311.1, 311.5, 316.6, 212, 910, 254, 109, 110, 138, 137; 156/164, 229, 299, 290, 291

[56] References Cited

U.S. PATENT DOCUMENTS

| | | | |
|---|---|---|---|
| 2,533,976 | 12/1950 | Teague | 428/253 |
| 2,628,654 | 2/1953 | Alderfer | 428/253 |
| 3,028,279 | 4/1962 | Heberlein | 156/229 |
| 3,186,893 | 6/1965 | Mercer | 428/255 |
| 3,405,027 | 10/1968 | Wyckoff | 156/229 |
| 3,463,690 | 8/1969 | Converse et al. | 156/291 |
| 3,906,943 | 8/1975 | Arluck | 428/247 |
| 4,285,998 | 8/1981 | Thibodeau | 428/110 |

Primary Examiner—James J. Bell
Attorney, Agent, or Firm—Harvey G. Lowhurst

[57] ABSTRACT

An orthopedic traction harness which engages the skin around the limb to be put in traction. The traction harness comprises an inner, circumferentially adjustable, laminated traction band having an outer layer of a compressible sponge material, a central layer of a flexible unidirectional stretch mesh and an inner layer of another compressible sponge material, and an outer, variable pneumatic pressure cuff including a flexible air bladder inside an adjustable containment cuff having a squeeze bulb and a pressure indicator.

4 Claims, 4 Drawing Figures

U.S. Patent  Sep. 28, 1982  4,351,872
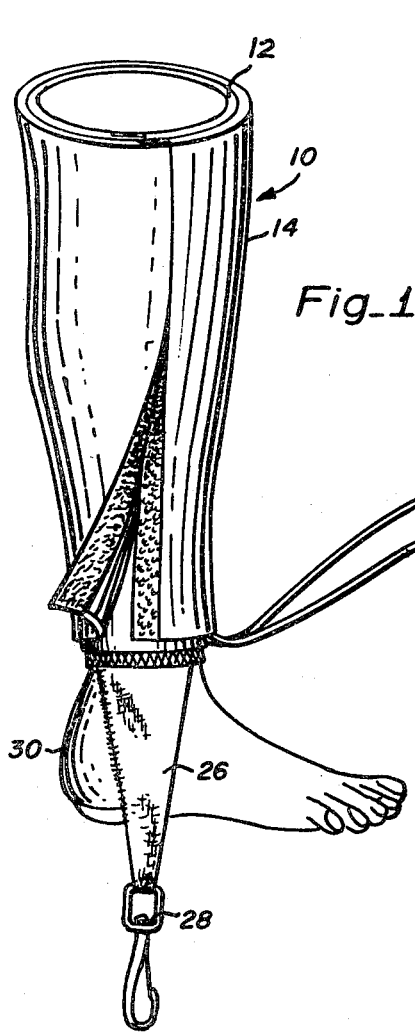
Fig_1
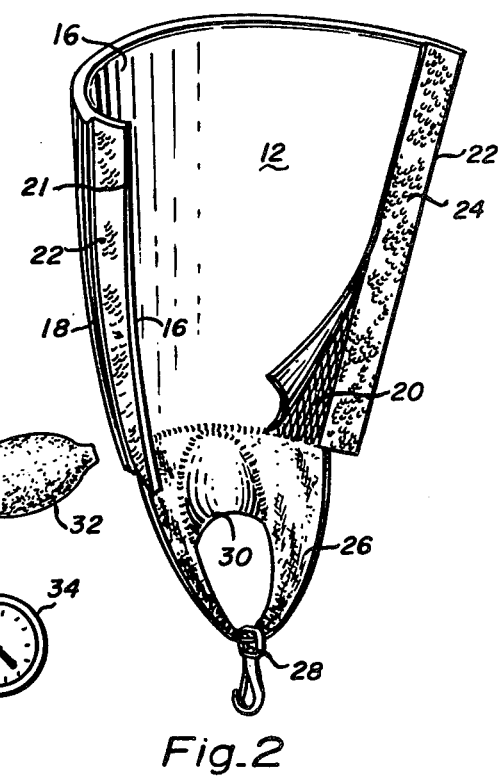
Fig_2
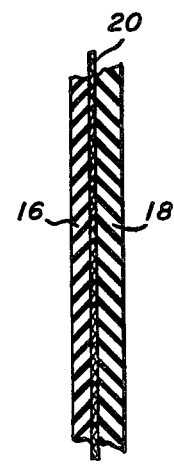
Fig_3
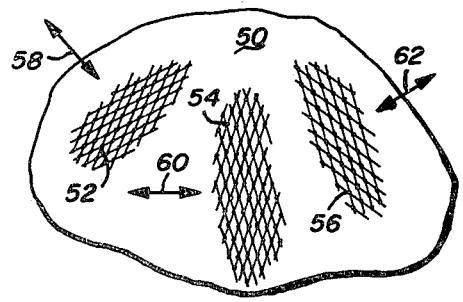
Fig_4

UNIDIRECTIONAL STRETCH MESH LAMINATE AND METHOD

This is a division of application Ser. No. 827,229 filed Aug. 24, 1977 now U.S. Pat. No. 4,146,021.

BACKGROUND OF THE INVENTION

1. Field of the Invention

The present invention relates to orthopedic traction harnesses for applying traction to a patient's limb, and more particularly, to a disposable traction band for contacting the skin and a reusable pneumatic cuff for overlying the traction band.

2. Description of the Prior Art

One type of prior art traction harness for attachment of a tensioning weight to a patient's limb has utilized adhesive tapes or adhesive pads for direct application to the skin, thus inducing locally high levels of skin shear which limits the safe total tractive loads applicable. In addition, these devices may cause allergic reactions in the patient, provide no limb cushioning or ventilation, and are painful and time consuming to apply and remove.

Another type of prior art traction harness utilized bands or splints which are cushioned with foam or sponge material which is placed against the limb, and means for securing such a traction band to the limb are adhesives, or hook and loop type fabric fasteners such as Velcro surrounding such bands. These harnesses are objectionable because the foam padding, being stretchable, does not provide uniform shear throughout the length of the skin contact and also cause displacement of the harness because of the stretch of the foam in the direction of traction.

Additionally, these prior art harnesses are subject to a major medical drawback, namely the inability of controlling the circumferential compression forces on the patient's limb. The securing tape, straps or wrappings of the prior art traction harnesses may be applied so tightly as to restrict or at least to reduce to an undesirable extent blood flow to the extremities, thus requiring monitoring and rewrapping. Or if the straps or fasteners are not wrapped tightly enough, the device will slip down to the malleolus causing blood restriction and skin slough. As traction of the limbs is sometimes necessary for an extended period of time, control of the circumferential compressive forces, as well as uniformity of such forces, becomes of great importance.

SUMMARY OF THE INVENTION

It is one object of the present invention to provide a traction harness that exerts substantially constant pressure over the entire skin surface engaged by the harness surrounding the limb to be put in traction with the pressure being controllable within wide limits.

It is another object of the present invention to provide an improved traction harness which offers flexible circumferential adhesion while maintaining controlled longitudinal shear by use of a unidirectional stretch mesh.

It is still another object of the present invention to provide an improved traction harness in which the distributed longitudinal shear is transferred to a stirrup attached to the lower edge of the traction band of the harness and to which a weight may be secured.

It is a further object of the present invention to provide a pneumatic cuff around the traction band which allows adjustment of the circumferential pressure applied to the skin and which uniformly distributes the skin shearing force.

It is still a further object of the present invention to provide a method for limiting the pressure on a limb to a safe medical level consistent with the orthopedic application of the device, and a method for monitoring and changing the amount of circumferential pressure existing on the patient's limbs.

It is still a further object of the present invention to provide a harness which is comprised of a disposable inner traction band and a reusable outer pneumatic cuff which are readily applicable to and removable from the limb without causing discomfort to the patient.

It is still another object of the present invention to provide a harness which results in maximum comfort to the patient by use of compressible sponge materials inside the traction band which is laminated to provide only a one-way stretch and which is supported against the skin by an air cushion from an outer pressure cuff.

Still another object of the present invention is to cushion the patient's heel in such a manner that when combined with the forces acting upon the stirrup, foot drop is avoided.

It is still another object of the present invention to provide a sheet material that has selected areas providing one-way stretch along different selected directions, and a method of converting a two-way stretch material into one that has one or more areas having only a one-way stretch and one or more selected directions.

In accordance with a preferred embodiment of the present invention, a traction harness is provided which includes an inner traction band which is placed directly against the skin and an outer pneumatic cuff which is placed around the traction band and which may be inflated to a circumferential pressure consistent with continued patient comfort. The traction band is a laminate in which two layers of a compressible sponge material, such as neoprene, are bonded to a unidirectional stretch mesh so that the sponge material is converted from a two-way stretch material to a one-way stretch material. The direction of stretch is selected to be perpendicular to the direction of traction so that the stretch is circumferential and not longitudinal. Further, there is provided a material which is inherently two-way stretchable, and which is bonded to a unidirectional stretch mesh while retaining the non-stretch qualities of the material such as good skin traction or the like. The unidirectional stretch mesh may be bonded to the other material in patches, and at selected stretch orientations, so that a material is obtained that is two-way stretch with selected portions thereof being restricted to one-way stretch in selected directions.

BRIEF DESCRIPTION OF THE DRAWINGS

FIG. 1 is a perspective view of the traction harness of this invention wound around a patient's leg, with a portion of the pneumatic cuff broken away for exposing the underlying traction band, and with a stirrup attached;

FIG. 2 is a perspective view of the inner traction band with the stirrup attached to its lower edge portion;

FIG. 3 is a cross-sectional view of the traction band, showing its laminated construction, and;

FIG. 4 is an elevational view of a section of material having laminated thereto unidirectional stretch mesh portions in selected locations and with selected orientations.

DETAILED DESCRIPTION OF THE INVENTION

The orthopedic traction harness of this invention, designated generally by reference character 10 in FIG. 1 of the drawings, is comprised of an internal traction band 12 and an external pneumatic pressure cuff 14 which fits around band 12. Internal traction band 12, as best seen in FIGS. 2 and 3, is a laminate comprised of a pair of sheets 16 and 18 of soft, flexible synthetic sponge material, such as neoprene, having a thickness of between ⅛" and ¼" thick, bonded to a central unidirectional stretch mesh 20. Mesh 20 may be commercially available Dupont plastic netting, and is oriented between the inner and outer sheets 16 and 18 in such a manner that the stretch is provided in the circumferential direction and no stretch is provided in the longitudinal direction, i.e., in the direction of the stirrup.

Band 12 is essentially a piece of flat material which is shaped and dimensioned to conform generally to the limb around which it is wound. Band 12 has longitudinal edges 21 and 22 which are, respectively, provided with a fastening means such as fabric hooks and loop type (Velcro) fasteners 23 and 24, or with a zipper or buttons or the like. In case of Velcro fasteners, it has been found convenient to attach one to the inner surface of band 12 along one edge and the other to the outer surface of the band along the other edge so that they close in a longitudinal overlapping manner.

Laminated neoprene band 12 provides circumferential elasticity around the patient's leg to thereby completely conform to its shape and making complete skin contact while preventing any elongation in the longitudinal stress direction of the traction band.

Attached to the lower edge of unidirectional mesh 20 is a soft, flexible material which forms stirrup 26 and which transfers the longitudinal shear forces generated in mesh 20 to a tension snap swivel 28. The portion of stirrup 26 that faces the heel of the patient is provided with a layer of thick contoured sponge material 30 which conforms to the upper portion of the patient's heel to resist rotational moment induced by the patient's foot.

In use, the patient's foot is placed in stirrup member 26 and inner traction band 12 fitted circumferentially around the leg and fastened longitudinally by interengaging the respective fasteners 23 and 24. Thereafter, outer pneumatic cuff 14 is placed around band 12 and air is pumped into the cuff by pressing pressure squeeze bulb 32 until a desired pressure is reached as indicated by pressure gauge 34.

Pneumatic pressure cuff 14 may be of the general type that is commercially available and medically in common use for measuring the blood pressure of a person. In these devices, there is also provided, in addition to the squeeze bulb and the pressure gauge, a valve to allow the rapid decrease of pressure. This feature is also desirable for use of this cuff with the harness because it allows convenient decreases in pressure. In addition, there is also provided a pressure relief valve 36 to limit the pneumatic pressure to a safe medical level. For best results, the shape and dimension of the pneumatic cuff should conform to the shape and dimension of the band about which it is fastened so that the entire band is urged, with uniform pressure, against the skin it is encircling.

It should also be noted that band 12 has very special properties in that a pair of two-way stretch neoprene sheets are converted into a one-way stretch laminate. It has been found that neoprene is a superior material for bearing against the skin because it is nonallergic and grips the skin very efficiently. But the two-way stretch of the neoprene would eliminate it as a suitable band material were it not for the unidirectional stretch properties of the material laminated to it.

Referring now to FIG. 4 of the drawing, there is another embodiment of the invention for converting a two-way stretch material into a one-way stretch material at selected areas and along selected directions. More particularly, a portion of a two-way stretch material 50 is selectively laminated with unidirectional stretch mesh patches 52, 54 and 56 which have, respectively, stretch orientations of 58, 60 and 62. It should be clear that material portion 50 may be a two-ply laminate at selected portions of the material, the second ply being the unidirectional stretch material, or may be a three-ply laminate, such as shown in FIG. 3, again the center ply being those portions as shown at 52, 54 and 56.

There are many applications, in the garment and the packing industry, where a two-way stretch material is desired except that in certain locations, a one-way stretch is preferred, and the one-way stretch may be conformed to selected directions at selected locations.

Obviously, many modifications and variations in the present invention are possible without departure from the spirit and scope of the invention, and that the specification and drawings are to be considered as merely illustrative, rather than limiting.

What is claimed is:

1. A substantially flat sheet of material comprising:
   a first layer of two-way stretch material; and
   at least one pad of unidirectional stretch mesh bonded to said first layer at a selected location thereof and having selected angular orientation to restrict said selected location to a one-way stretch in a direction determined by said selected orientation.

2. A substantially flat sheet of material as recited in claim 1 in which a plurality of unidirectional stretch mesh pads are bonded to said first layer at selected locations and having selected angular orientations.

3. A substantially flat sheet of material as recited in claim 2 in which a second layer of two-way stretch material is bonded to the surface of said first layer to which said pads are bonded to form a laminate of two layers of two-way stretch material with unidirectional stretch mesh pads sandwiched between them.

4. The method of restricting the stretch of a piece of two-way stretch material to a one-way stretch at selected locations and in selected directions comprising the step of:
   bonding a unidirectional stretch mesh to said piece of two-way stretch material of said selected locations and orientation angularly to provide stretch in said selected directions.

* * * * *